United States Patent
Ichioka

[11] 3,788,597
[45] Jan. 29, 1974

[54] ELECTROMAGNETIC FLOW CONTROLLING VALVE

[75] Inventor: Hisakazu Ichioka, Yokohama, Japan

[73] Assignee: Yukon Kogyo Company Ltd., Kanagawa-ken, Japan

[22] Filed: May 31, 1972

[21] Appl. No.: 258,296

[52] U.S. Cl. ................... 251/129, 251/130
[51] Int. Cl. ........................... F16k 31/06
[58] Field of Search .. 137/625.65, 625.61; 251/129, 251/130, 137, 140

[56] References Cited
UNITED STATES PATENTS

| | | |
|---|---|---|
| 3,069,846 | 12/1962 | Buescher .................. 251/129 X |
| 3,472,483 | 10/1969 | Janczur ..................... 251/129 |
| 3,701,366 | 10/1972 | Tirelli ..................... 251/129 X |
| 3,153,749 | 10/1964 | Andrews .................. 251/137 X |
| 3,325,139 | 6/1967 | Diener et al. ............. 251/129 |

*Primary Examiner*—Arnold Rosenthal
*Attorney, Agent, or Firm*—Harold D. Steinberg et al.

[57] ABSTRACT

An electromagnetic flow controlling valve wherein a spring actuated by the magnetic pull force excited by a DC solenoid can provide a variable opening between a fixed sleeve and a movable spool, so as to control the quantity of flow according to the variable size of the opening.

7 Claims, 3 Drawing Figures

ELECTROMAGNETIC FLOW CONTROLLING VALVE

BACKGROUND OF THE INVENTION

Many types of controlling valves are developed and made practically available, but the most important parts of these flow controlling valves, springs, had often been regulated manually. There had been, however, no technique to control the spring electrically, that is to say, to regulate springs continuously in the desired position by the linear movement of the rod actuated according to the magnetic pull force caused by the excitation of a coil, or the like, so as to control the flow quantity.

This invention provides such an electrical type of flow controlling valve wherein the current applied to the solenoid can be regulated and control the flow quantity, and to telecontrol it, if desired, from a distance.

SUMMARY OF THE INVENTION

This invention provides an electromagnetic flow controlling valve wherein a spring for regulating the quantity of flow can be pressed by a horizontally movable rod through a movable spool in the hollow interior of which one end of said spring is inserted and positioned, the other end of said spring being fixed in a spring bearing, said rod being fixed on an induced iron core which is placed opposite to two iron cores, either or both of said fixed cores and said induced core being wound in the periphery by coils, and wherein the equivalent mutual magnetic pull force caused between said fixed cores and said induced core by means of the exciting current of said coil can be changed into a linear movement of said rod which moves said movable spool up to a balanced point between the reaction of said spring pressed by said movable spool and said equivalent magnetic pull force, so as to form variable opening between said movable spool and a fixed sleeve placed on said spool, and thus to regulate the quantity of flow according to the largeness of said opening.

BRIEF DESCRIPTION OF THE DRAWINGS

A preferred embodiment of this invention will be now described, by way of example, with reference to the accompanying drawings.

DESCRIPTION OF THE SPECIFIC EMBODIMENT

Figure 1:
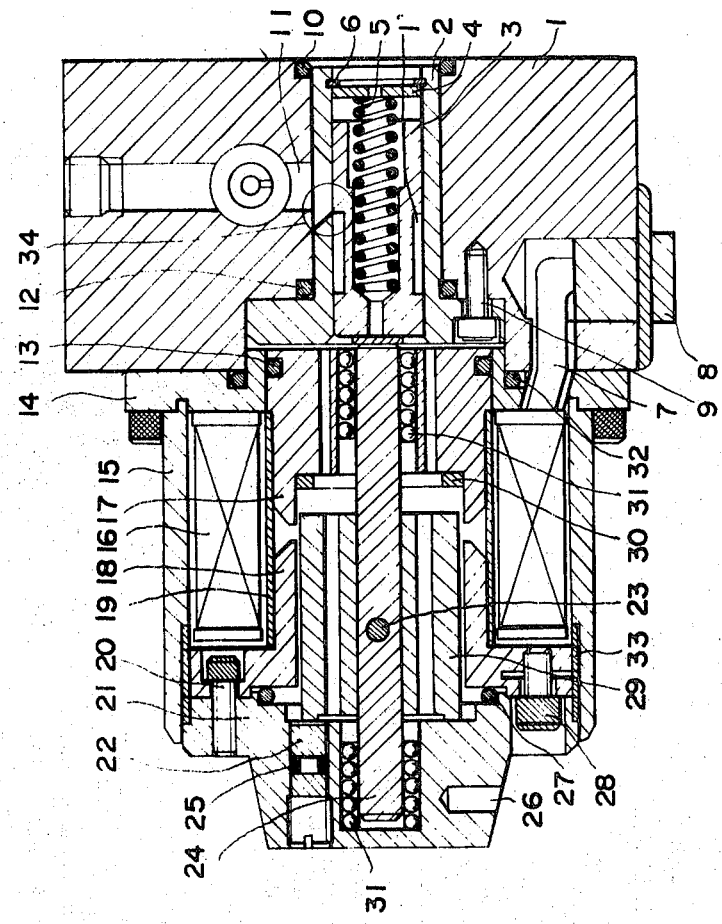
FIG. 1 shows a view of vertical and longitudinal section describing an embodiment according to this invention.

In the drawings, the valve body 1 has a central hole 1' formed horizontally in the central part of valve and a connector 8 of solenoid terminal mounted on a part of the periphery of said body.

A fixed sleeve 2 is inserted in said central hole 1' and fastened on said valve body with a clamping bolt 9. A spring 5 is inserted in the interior of a movable spool 3 also inserted in said fixed sleeve 2, the end of said spring being supported in a spring bearing or shoe 4 which is positioned in said sleeve 2 by a snap ring 6.

Two "O" rings 10 and 12 are put on the sleeve 2 to prevent the periphery of the sleeve 2 from oil leakage. The movable spool 3 is bored horizontally in the center part in order to avoid the influence of pressure.

The fixed iron cores 17 and 18 are pushed in a bush 19, and besides, the fixed cores 17 and 18 are fixed on a solenoid cover 21 with a clamping bolt 20 so that said cores, said bush and said solenoid cover comprise one body. Furthermore, a rod 24 and an armature or induced iron core 29 are fixed on said member with a pin 23. Therefore, the first position of the movable spool 3 can be set by moving the position of the rod 24.

Precisely, the inside end face of the solenoid cover 21 and the end face of the induced core 29 are always in contact with each other, because the end of said rod 24 and consequently said induced core 29 are thrusted toward said solenoid cover 21 through the movable spool 3 adjoining to said rod by the reaction of the spring 5. Here, if a stroke-regulating screw 22 is rotated, the induced core 29 moves horizontally, and consequently the rod 24 fixed onto said member through said induced core 29 with said pin 23 also moves horizontally. Therefore, the movable spool 3 adjoining to the end of said rod 24 also moves horizontally to set the first position of said rod 24. And furthermore, the movable spool 3 can be fixed in the first determined position by fastening a swivel-check bolt 28.

Besides, by operating said stroke-regulating screw 22, a very small variable opening can be provided between the fixed sleeve 2 and the movable spool 3, so as to control the quantity of microflow.

The periphery of the cores 17 and 18 on the induced core 29 is wound with a coil 16. The solenoid cover 21 can not only fix the coil 16 through the flange of said fixed core 18, but also support said rod 24.

Slide bearings 31 are placed in the hollow interiors of the fixed core 17 and the solenoid cover 21 to support the rod 24 and to make the horizontal movement of said rod smooth. The coil 16 and the solenoid cover 21 are contained in adjacency to the inside wall in a solenoid case 15 which is fixed through a mounting seat 14 by welding.

"O" rings 13, 27 and 32 are applied in order to prevent the solenoid from oil leakage. In the interior of said solenoid cover 21 is screwed a manual regulating bolt 22 which engages with the armature induced core 29 in one end and rotatable in the other end by a screw driver for regulation of said solenoid member. An "O" ring 25 is applied onto the manual regulating bolt 22 to prevent it from oil leakage. A lead cable 7 of the coil 16 is connected to said solenoid connector 8.

As this invention has such a construction as described above, the quantity of oil flow can be controlled according to the variable largeness of the opening 34 provided between the fixed sleeve 2 and the movable spool 3, because the position of the movable spool 3 is set in the balanced state between the thrust-back force of said spool in the influence of the reaction of said spring 5 and the equivalent mutual magnetic pull force applied from said solenoid member to said rod 24.

Therefore, the regulated variation of the thrust-back force of the spring 5 and the magnetic pull force of the solenoid member permits changing the largeness of said opening 34 and thus increasing or decreasing the quantity of flow.

Figure 2:
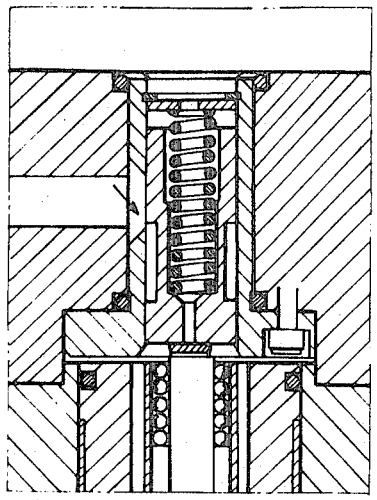
FIGS. 2 and 3 show in detail the opening part of the embodiment according to this invention shown in FIG. 1, respectively in the "shut" position and in the "open" position.
Figure 3:
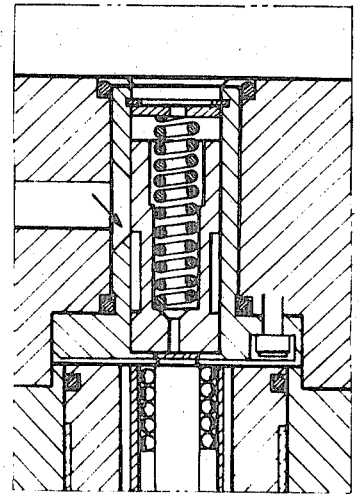

FIGS. 2 and 3 show the "shut" and "open" positions of the opening 34 respectively.

All the conventional techniques of flow regulation had been manual and mechanical and based upon the rotation of such an element as corresponding to the rod 24 shown in the drawings.

However, according to this invention, the regulation of flow is effected electromagnetically.

Precisely, the fixed cores 17 and 18 and the induced core 29 are excited magnetically to pull each other, when the coil 16 is energized. Then, said induced core 29 and the rod 24 are moved in the longitudinal and right direction in the drawings, because the core 29 and the rod 24 are horizontally movable together, and the end of said rod thrusts the movable spool 3 to the right to press the spring 5, so that a variable opening is provided between the fixed sleeve 2 and said movable spool 3 to increase the quantity of flow.

The increased quantity of flow can be almost proportional to the exciting current of the coil 16, and therefore, the desired regulation of the quantity of flow can be effected by controlling the current applied to the coil 16.

The current applied to the coil 16 can be telecontrolled freely so that the quantity of flow can be also telecontrolled.

The control of the current applied to the coil 16 can be easily effected in a separate control circuit by dial operation or automatic teleoperation.

To obtain more stable performance of the valve according to this invention, the feed-back control can be easily effected by converting the detected controlled current or quantity of flow into the electric signal.

The manual regulating bolt 22 can be used also in case of an emergency such as power-off, accident of the control circuit, etc., wherein the thrust-back force or reaction of the spring 5 can be regulated only by turning the manual regulating bolt 22 to move the rod 24 and the movable spool 3 longitudinally to right and left.

As it has been described above, according to this invention it is possible to regulate the spring 5 to control the quantity of flow only by the linear movement of the rod 24. Therefore, it has such advantage that the spring 5 is not likely to be "twisted," that the controlling valve can be easily telecontrolled, and that the setting of the quantity of flow requires only extremely short time and simple operation, that is, operation of setting the current value applied to the coil 16.

Besides, this invention has excellent advantages that the manual regulation of the quantity of flow is also possible in case of emergency and that it is possible to set the first position of the movable spool 3 and execute precise and rough regulations.

Thus it will be seen that according to the present invention an electrically regulated flow-control assembly is provided, with this assembly including a valve means and an electromagnet means operatively connected with the valve means for controlling the latter. The valve means includes an outer valve member 2 which is formed with the port through which the fluid flows and an inner valve member 3 which is slidable with respect to the outer valve member from an initial closed position to a position where the degree to which the port is uncovered by the inner valve member will control the extent of fluid flow. The spring 5 forms a spring means urging the inner valve member to its initial closed position. The electromagnet means includes the movable armature 29 and the elongated rod 24 which is axially fixed thereto and which engages the inner slidable valve member 3. Thus, the slidable valve member 3 and the rod 24 together with the armature 29 have a common axis, and in accordance with the extent to which the electromagnet means is energized the armature together with the rod will be displaced to control the degree to which the inner slidable valve member 3 is displaced in opposition to the spring means 5 from its initial closed position to control the extent of flow of fluid through the port of the outer valve member. As was described above, the electromagnet means includes the manually operable adjusting means formed by the element 22 which directly engages the armature to determine the end position to which the latter is displaced through the force of the spring means 5 when the electromagnet means is unenergized, so that in this way the adjusting means 22 enables the initial closed position of the inner slidable valve member 3 to be determined.

I claim:

1. In an assembly for electrically controlling the flow of a fluid, valve means and electromagnet means operatively connected therewith for controlling the same, said valve means including an outer valve member formed with a port through which the fluid to be controlled is adapted to flow and an inner valve member slidable with respect to the outer valve member for controlling the closing and opening of the port thereof, said inner valve member having an initial closed position closing said port, said valve means including a spring means acting on said inner valve member for urging the latter to its initial closed position, said electromagnet means including an armature and a rod coaxially fixed with said armature and having an axis which is common to an axis along which said inner valve member moves, said rod engaging said inner valve member so that said spring means acts through said inner valve member and rod on said armature to urge the latter to an initial rest position, and said electromagnet means carrying an adjusting means which cooperates with said armature means for determining the rest position of the latter and for thus determining the initial closed position of said inner valve member, whereby the extent to which the inner valve member uncovers said port may be determined by the extent to which said electromagnet means is energized for displacing said armature and rod together with said inner valve member in opposition to said spring means, while the initial closed position of said inner valve member is determined by said adjusting means so that the extent to which said port is uncovered upon energizing said electromagnet means is also determined by said adjusting means.

2. The combination of claim 1 and wherein said outer valve member is in the form of a tubular sleeve which is formed with said port and said inner valve members in the form of a spool valve member slidable in said sleeve, said spool valve member being formed with an internal axially extending bore into which said spring means extends.

3. The combination of claim 1 and wherein said adjusting means is in the form of a manually adjustable member engaging said armature.

4. The combination of claim 3 and wherein said electromagnet means includes an end cover which carries said adjusting means.

5. The combination of claim 4 and wherein said electromagnet means includes stationary core members surrounding said armature which itself forms a movable core member, and said electromagnet means including a winding carried by one of said core members.

6. The combination of claim 5 and wherein said winding surrounds the stationary core members.

7. The combination of claim 3 and wherein said rod extends through and beyond said armature and said electromagnet means including a pair of guide bearings engaging portions of the rod which are respectively situated beyond said armature for guiding said rod and said armature therewith.

* * * * *